(12) United States Patent
Rahman et al.

(10) Patent No.: US 9,109,293 B2
(45) Date of Patent: Aug. 18, 2015

(54) ELECTROCATALYST FOR ELECTROCHEMICAL CONVERSION OF CARBON DIOXIDE

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventors: Saleem Ur Rahman, Dhahran (SA); Syed Mohammed Javaid Zaidi, Dhahran (SA); Shakeel Ahmed, Dhahran (SA); Sk Safdar Hossain, Kolkata (IN)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 0 days.

(21) Appl. No.: 14/340,619

(22) Filed: Jul. 25, 2014

(65) Prior Publication Data

US 2014/0336037 A1    Nov. 13, 2014

Related U.S. Application Data

(62) Division of application No. 13/437,766, filed on Apr. 2, 2012.

(51) Int. Cl.
| | | |
|---|---|---|
| *B01J 37/34* | (2006.01) | |
| *B01J 21/00* | (2006.01) | |
| *B01J 23/00* | (2006.01) | |
| *B01J 25/00* | (2006.01) | |
| *B01J 29/00* | (2006.01) | |
| *B01J 31/00* | (2006.01) | |
| *B01J 37/00* | (2006.01) | |
| *C08F 4/02* | (2006.01) | |
| *C08F 4/60* | (2006.01) | |
| *C25B 11/04* | (2006.01) | |
| *C25B 3/04* | (2006.01) | |
| *B82Y 30/00* | (2011.01) | |

(52) U.S. Cl.
CPC .............. *C25B 11/0478* (2013.01); *C25B 3/04* (2013.01); *C25B 11/04* (2013.01); *B82Y 30/00* (2013.01)

(58) Field of Classification Search
USPC .............. 204/282; 502/5, 100, 101, 102, 104
See application file for complete search history.

(56) References Cited

U.S. PATENT DOCUMENTS

| | | | | |
|---|---|---|---|---|
| 4,959,131 | A * | 9/1990 | Cook et al. ..................... | 205/462 |
| 6,099,963 | A * | 8/2000 | Medeiros et al. ............. | 428/399 |
| 6,099,965 | A | 8/2000 | Tennent et al. | |
| 6,432,866 | B1 | 8/2002 | Tennent et al. | |
| 6,809,229 | B2 | 10/2004 | Moy et al. | |
| 6,936,565 | B2 * | 8/2005 | Ma et al. ....................... | 502/174 |
| 7,146,655 | B2 * | 12/2006 | Karnopp et al. .................. | 4/254 |
| 7,923,403 | B2 | 4/2011 | Ma et al. | |
| 7,968,489 | B2 | 6/2011 | Ma et al. | |

FOREIGN PATENT DOCUMENTS

| | | |
|---|---|---|
| CN | 101607203 B | 12/2009 |
| CN | 101786001 A | 7/2010 |
| CN | 102091618 A | 6/2011 |
| WO | WO 2007/041872 A1 | 4/2007 |

OTHER PUBLICATIONS

M. Gangeri, S. Perathoner, S. Caudo, G. Centi, J. Amadou, D. Bégin, C. Pham-Huu, M.J. Ledoux, J.-P. Tessonnier, D.S. Su, R. Schlögl, "Fe and Pt carbon nanotubes for the electrocatalytic conversion of carbon dioxide to oxygenates", *Catalysis Today* 143 (2009), 57-63. Foreign patents and non-patent literature have been provided in parent U.S. Appl. No. 13/437,766, filed Apr. 2, 2012, the priority of which is claimed.

* cited by examiner

*Primary Examiner* — James McDonough
(74) *Attorney, Agent, or Firm* — Richard C Litman

(57) ABSTRACT

An electrocatalyst for the electrochemical conversion of carbon dioxide to hydrocarbons is provided. The electrocatalyst for the electrochemical conversion of carbon dioxide includes copper material supported on carbon nanotubes. The copper material may be pure copper, copper and ruthenium, copper and iron, or copper and palladium supported on the carbon nanotubes. The electrocatalyst is prepared by dissolving copper nitrate trihydrate in deionized water to form a salt solution. Carbon nanotubes are then added to the salt solution to form a suspension, which is then heated. A urea solution is added to the suspension to form the electrocatalyst in solution. The electrocatalyst is then removed from the solution. In addition to dissolving the copper nitrate trihydrate in the deionized water, either iron nitrate monohydrate, ruthenium chloride or palladium chloride may also be dissolved in the deionized water to form the salt solution.

8 Claims, No Drawings

ELECTROCATALYST FOR ELECTROCHEMICAL CONVERSION OF CARBON DIOXIDE

This application is a divisional of U.S. Ser. No. 13/437,766, filed on Apr. 2, 2012, currently pending.

BACKGROUND OF THE INVENTION

1. Field of the Invention

The present invention relates to electrochemical catalysts, and particularly to an electro catalyst for the electrochemical conversion of carbon dioxide to hydrocarbons, such as methanol and methane.

2. Description of the Related Art

Over the past several decades, various electrode materials have been researched for the reduction of carbon dioxide ($CO_2$) into different products, most notably formic acid, carbon monoxide (CO), methane and methanol. Conventional metals used in the research were provided in the form of high purity foils, plates, rotating discs, wires, beds of particles, tubes and mesh. These are all macroscopic materials. Thus, when compared to microscopic or nanoscopic materials, they all have relatively low surface areas and low conductivity electrical supports.

It would be desirable to provide an electrocatalytic material formed on nanostructures, thus greatly increasing available reactive surface area and conductivity. Given the destructive nature of carbon dioxide as a greenhouse gas, increasing the efficiency of electrocatalysts to form benign hydrocarbons, such as methanol, is obviously quite important. Further, it would be desirable to not only increase the overall efficiency of the catalytic process, but also provide an electrocatalyst that operates under relatively low temperatures and in the range of atmospheric pressure.

Thus, an electrocatalyst for the electrochemical conversion of carbon dioxide solving the aforementioned problems is desired.

SUMMARY OF THE INVENTION

The electrocatalyst for the electrochemical conversion of carbon dioxide includes a copper material supported on carbon nanotubes. The copper material may be pure copper, such that the pure copper forms 20 wt % of the electrocatalyst; or copper and ruthenium supported on the carbon nanotubes such that the copper forms 20 wt % of the electrocatalyst and the ruthenium forms 20 wt % of the electrocatalyst; or copper and iron supported on the carbon nanotubes such that the copper forms 20 wt % of the electrocatalyst and the iron forms 20 wt % of the electrocatalyst; or copper and palladium supported on the carbon nanotubes such that the copper forms 20 wt % of the electrocatalyst and the palladium forms 20 wt % of the electro catalyst. The metal supported on carbon nanotubes is prepared using homogenous deposition-precipitation with urea.

The electrocatalyst is prepared by first dissolving copper nitrate trihydrate ($Cu(NO_3)_2$ $3H_2O$) in deionized water to form a salt solution. Carbon nanotubes are then added to the salt solution to form a suspension, which is then heated. A urea solution is added to the suspension to form the electrocatalyst in solution. The electrocatalyst is then removed from the solution. In addition to dissolving the copper nitrate trihydrate ($Cu(NO_3)_2$ $3H_2O$) in the deionized water, either iron nitrate monohydrate ($Fe(NO_3)_2$ $H_2O$), ruthenium chloride ($RuCl_3$), or palladium chloride ($PdCl_2$) may also be dissolved in the deionized water to form the salt solution.

These and other features of the present invention will become readily apparent upon further review of the following specification.

DETAILED DESCRIPTION OF THE PREFERRED EMBODIMENTS

The electrocatalyst for the electrochemical conversion of carbon dioxide to hydrocarbons, such as methanol and methane, includes a copper material supported on carbon nanotubes. The copper material may be pure copper, such that the pure copper forms 20 wt % of the electrocatalyst; or copper and ruthenium supported on the carbon nanotubes such that the copper forms 20 wt % of the electro catalyst and the ruthenium forms 20 wt % of the electrocatalyst; or copper and iron supported on the carbon nanotubes such that the copper forms 20 wt % of the electrocatalyst and the iron forms 20 wt % of the electrocatalyst; or copper and palladium supported on the carbon nanotubes such that the copper forms 20 wt % of the electrocatalyst and the iron forms 20 wt % of the electrocatalyst.

The electrocatalyst is prepared by first dissolving copper nitrate trihydrate ($Cu(NO_3)_2$ $3H_2O$) in deionized water to form a salt solution. Using exemplary quantities, the copper nitrate trihydrate is dissolved in about 220 mL of the deionized water and then stirred for about thirty minutes. Using the exemplary volume of deionized water given above, about one gram of carbon nanotubes (preferably single wall carbon nanotubes) are then added to the salt solution to form a suspension, which is then sonicated for about one hour and heated to a temperature of about 90° C. with stirring.

A urea solution is added to the suspension to form the electrocatalyst in solution. Using the exemplary quantities given above, about 30 mL of an about 0.42 M aqueous urea solution may be added to the suspension (about 6 g of urea are added to the solution). Preferably, the urea solution is added to the suspension in a drop-wise fashion. The urea solution and suspension are then maintained at a temperature of about 90° C. for about eight hours, with stirring.

The electrocatalyst is then removed from the solution, preferably by first cooling the solution to room temperature, centrifuging the solution to separate out the electrocatalyst, and then washing and drying the catalyst at a temperature of about 110° C. overnight. The electrocatalyst may then be calcined at a temperature of about 450° C. for about four hours in an argon gas flow. Following calcination, the electrocatalyst is reduced at a rate of about 100 mL/min at a temperature of about 450° C. for about four hours in a gas flow of about 10% hydrogen in argon. The result is a solid powder having a particle size in the range of 3-60 nm.

In addition to dissolving the copper nitrate trihydrate ($Cu(NO_3)_2$ $3H_2O$) in the deionized water, either iron nitrate monohydrate ($Fe(NO_3)_2$ $H_2O$), ruthenium chloride ($RuCl_3$), or palladium chloride ($PdCl_2$) may also be dissolved in the deionized water to form the salt solution. The carbon nanotubes preferably have diameters of about 3-60 nm, and may be prepared by a conventional deposition-precipitation method.

In the following, each catalyst was tested in an electrochemical reactor system operated in phase mode. The electrochemical system was similar to a fuel cell test station. Humidified carbon dioxide was fed on the cathode side and 0.5 M $NaHCO_3$ was used as an analyte on the anode side. Each electrocatalyst sample was dissolved in a solvent and painted or coated on one side of a solid polymer electrolyte (SPE) membrane, viz., a proton conducting Nafion® 117 membrane (manufactured by E.I. Du Pont De Nemours and Company of Delaware), with 60% Pt—Ru deposited on Vulcan® carbon (manufactured by Vulcan Engineering Ltd. of the United Kingdom) being used as an anode catalyst. Permeation of sodium bicarbonate solution through the membrane provided the alkalinity required for the reduction reaction to occur. Feeding $CO_2$ in the gas phase greatly reduced the mass transfer resistance.

For the first electrocatalyst sample, using pure copper forming 20 wt % of the electrocatalyst, using the experimental reactor described above, at lower voltages (−0.5 V), no hydrocarbon was produced. Maximum faradaic efficiency for methanol was achieved at −1.5 V. Maximum faradaic efficiency for methane was achieved at −2.5 V. The overall results are given below in Table 1:

TABLE 1

Results of reduction of $CO_2$ over 20% Cu/CNT

| Potential vs. SCE/V | Current density | Faradaic Efficiency for hydrogen | Faradaic Efficiency for methanol | Faradaic Efficiency for methane | Faradaic Efficiency for carbon monoxide |
|---|---|---|---|---|---|
| −0.5 | 0.40 | 0 | 0 | 0 | 0 |
| −1.5 | 5.20 | 8.03 | 3.90 | 4.20 | 0 |
| −2.5 | 14.40 | 68.76 | 1.45 | 6.60 | 9.43 |
| −3.5 | 40.48 | 77.83 | 0.80 | 1.40 | 18.17 |

For the second electrocatalyst sample, using copper and ruthenium supported on the carbon nanotubes such that the copper forms 20 wt % of the electrocatalyst and the ruthenium forms 20 wt % of the electrocatalyst, using the experimental reactor described above, at lower voltages (−0.5 V), no hydrocarbon apart from methanol was produced. Maximum faradaic efficiency (15.5%) for methanol was achieved at −1.5 V. The overall results are given below in Table 2:

TABLE 2

Results of reduction of $CO_2$ over 20% Cu—20% Ru/CNT

| Potential vs. SCE/V | Current density | Faradaic Efficiency for hydrogen | Faradaic Efficiency for methanol | Faradaic Efficiency for carbon monoxide |
|---|---|---|---|---|
| −0.5 | 0.32 | 0 | 0 | 0 |
| −1.5 | 8.40 | 8.00 | 15.50 | 0 |
| −2.5 | 30.40 | 68.80 | 6.20 | 9.43 |
| −3.5 | 75.20 | 77.80 | 1.30 | 18.17 |

For the third electrocatalyst sample, using copper and iron supported on the carbon nanotubes such that the copper forms 20 wt % of the electrocatalyst and the iron forms 20 wt % of the electrocatalyst, using the experimental reactor described above, no hydrocarbon was detected in the working potential range. Instead, carbon monoxide was detected. The overall results are given below in Table 3:

TABLE 3

Results of reduction of $CO_2$ over 20% Cu—20% Fe/CNT

| Potential vs. SCE/V | Current density | Faradaic Efficiency for hydrogen | Faradaic Efficiency for carbon monoxide |
|---|---|---|---|
| −0.5 | 1.2 | 0 | 0 |
| −1.5 | 14.1 | 13.6 | 0 |
| −2.5 | 38.2 | 68.4 | 9.4 |
| −3.5 | 78.8 | 89.8 | 8.3 |

For the fourth electrocatalyst sample, using copper and palladium supported on the carbon nanotubes such that the copper forms 20 wt % of the electrocatalyst and the palladium forms 20 wt % of the electrocatalyst, using the experimental reactor described above, no hydrocarbon apart from formic acid was detected in the working potential range. At lower voltages (−0.5 V), no product was produced. Maximum faradaic efficiency (21.3%) of formic acid was achieved at −1.5 V. The overall results are given below in Table 4:

TABLE 4

Results of reduction of $CO_2$ over 20% Cu—20% Pd/CNT

| Potential vs. SCE/V | Current density | Faradaic Efficiency for hydrogen | Faradaic Efficiency for formic acid | Faradaic Efficiency for carbon monoxide |
|---|---|---|---|---|
| −0.5 | 0.42 | 0 | 0 | 0 |
| −1.5 | 7.6 | 8.0 | 9.5 | 0 |
| −2.5 | 28.5 | 68.8 | 21.3 | 10.3 |
| −3.5 | 54.2 | 73.8 | 18.2 | 9.8 |

It is to be understood that the present invention is not limited to the embodiments described above, but encompasses any and all embodiments within the scope of the following claims.

We claim:

1. A method of making an electrocatalyst for electrochemical conversion of carbon dioxide, comprising the steps of:
    dissolving copper nitrate trihydrate in deionized water to form a salt solution;
    adding carbon nanotubes to the salt solution to form a suspension;
    heating the suspension;
    adding a urea solution to the suspension to form an electrocatalyst in solution, the electrocatalyst comprising copper material supported on the carbon nanotubes;
    cooling the solution to room temperature;
    removing the electrocatalyst from the solution by centrifuging the solution to separate the electrocatalyst out of the solution;
    washing and drying the electrocatalyst at a temperature of about 110° C.; and
    calcining the washed and dried electrocatalyst at a temperature of about 450° C. for about four hours in an argon gas flow.

2. The method of making an electrocatalyst as recited in claim 1, further comprising the step of sonicating the suspension for about one hour.

3. The method of making an electrocatalyst as recited in claim 1, wherein the step of heating the suspension comprises heating the suspension to a temperature of about 90° C. with stirring.

4. The method of making an electrocatalyst as recited in claim 1, further comprising the step of maintaining the mixture of the urea solution and the suspension at a temperature of about 90° C. for about eight hours.

5. The method of making an electrocatalyst as recited in claim 1, further comprising the step of reducing the calcined electro catalyst at a rate of about 100 mL/min at a temperature of about 450° C. for about four hours in a gas flow of about 10% hydrogen in argon.

6. The method of making an electro catalyst for electrochemical conversion of carbon dioxide as recited in claim 1, further comprising the step of dissolving iron nitrate monohydrate in the deionized water to form the salt solution.

7. The method of making an electrocatalyst for electrochemical conversion of carbon dioxide as recited in claim 1, further comprising the step of dissolving ruthenium chloride in the deionized water to form the salt solution.

8. The method of making an electrocatalyst for electrochemical conversion of carbon dioxide as recited in claim 1, further comprising the step of dissolving palladium chloride in the deionized water to form the salt solution.

* * * * *